United States Patent
Miraboutalebi et al.

(10) Patent No.: US 11,433,581 B2
(45) Date of Patent: Sep. 6, 2022

(54) INJECTION MOLDING A DEVICE SUCH AS A CABLE HOLDER WITH AN INTEGRATED WIRELESS TAGGING FOIL

(71) Applicant: HELLERMANNTYTON GmbH, Tornesch (DE)

(72) Inventors: Farshad Miraboutalebi, Hamburg (DE); Hagen Spiess, Hamburg (DE)

(73) Assignee: Aptiv Technologies Limited, St. Michael (BB)

( * ) Notice: Subject to any disclaimer, the term of this patent is extended or adjusted under 35 U.S.C. 154(b) by 8 days.

(21) Appl. No.: 17/083,213

(22) Filed: Oct. 28, 2020

(65) Prior Publication Data
US 2021/0138703 A1     May 13, 2021

(30) Foreign Application Priority Data
Nov. 8, 2019  (DE) .......................... 102019130175.0

(51) Int. Cl.
*B29C 45/14* (2006.01)
*B29C 45/26* (2006.01)
(Continued)

(52) U.S. Cl.
CPC ........ *B29C 45/14065* (2013.01); *B29C 45/26* (2013.01); *B29C 2045/14147* (2013.01);
(Continued)

(58) Field of Classification Search
CPC .............. B29C 45/14065; B29C 45/26; B29C 2045/14147
See application file for complete search history.

(56) References Cited

U.S. PATENT DOCUMENTS

| | | | | |
|---|---|---|---|---|
| 4,866,816 A | * | 9/1989 | Caveney | ............... F16L 3/2332 264/296 |
| 4,882,116 A | * | 11/1989 | McMillen | ......... B29C 45/14549 264/254 |

(Continued)

FOREIGN PATENT DOCUMENTS

| | | |
|---|---|---|
| CN | 208538407 | 2/2019 |
| DE | 19620002 | 11/1996 |

(Continued)

OTHER PUBLICATIONS

"Foreign Office Action", EP Application No. 20203382.5, dated Jan. 10, 2022, 4 pages.

(Continued)

*Primary Examiner* — Edmund H Lee
(74) *Attorney, Agent, or Firm* — Colby Nipper PLLC

(57) ABSTRACT

The disclosure relates to a method for injection-molding a device, in particular a cable tie, with an integrated wireless tag, comprising the method steps of a) putting a tagging foil with two main surfaces which are separated by an edge, into a mold cavity of an open mold, where the tagging foil is held in place by a supporting device; b) closing the mold; c) injecting an injection material into the mold cavity parts adjoining the two main surfaces of the tagging foil simultaneously and symmetrically with respect to a main extension plane of the tagging foil which is parallel to the two main surfaces of the tagging foil so as to simplify and speed up the manufacturing process of a device with an integrated wireless tag or label. The disclosure furthermore relates to a corresponding molding device as well as a corresponding device with an integrated wireless tag.

16 Claims, 3 Drawing Sheets

(51) Int. Cl.
*B29L 31/34* (2006.01)
*B29L 31/00* (2006.01)

(52) U.S. Cl.
CPC . *B29C 2045/14155* (2013.01); *B29L 2031/34* (2013.01); *B29L 2031/727* (2013.01)

(56) References Cited

U.S. PATENT DOCUMENTS

| | | | | |
|---|---|---|---|---|
| 5,123,686 | A * | 6/1992 | Wenk | B65D 63/1072 |
| | | | | 292/307 R |
| 5,372,773 | A * | 12/1994 | Sorensen | B29C 45/43 |
| | | | | 264/328.1 |
| 5,389,330 | A * | 2/1995 | Sorensen | F16L 3/2336 |
| | | | | 24/17 AP |
| 5,440,786 | A * | 8/1995 | Sorensen | B65D 63/1081 |
| | | | | 24/17 AP |
| 5,524,945 | A * | 6/1996 | Georgopoulos | G09F 3/037 |
| | | | | 292/307 R |
| 5,593,630 | A * | 1/1997 | Sorensen | B29C 45/26 |
| | | | | 264/318 |
| 5,690,883 | A * | 11/1997 | Sorensen | B29C 45/4407 |
| | | | | 264/318 |
| 5,693,282 | A * | 12/1997 | Sorensen | B29C 45/43 |
| | | | | 264/334 |
| 5,765,885 | A * | 6/1998 | Netto | B65D 77/185 |
| | | | | 292/318 |
| 5,792,409 | A * | 8/1998 | Sorensen | B29C 45/26 |
| | | | | 425/572 |
| 5,969,613 | A * | 10/1999 | Yeager | E05B 73/0017 |
| | | | | 340/568.1 |
| 6,528,004 | B1 * | 3/2003 | Sorensen | B29C 45/40 |
| | | | | 264/318 |
| 6,863,855 | B2 * | 3/2005 | Shilale | B29C 45/14336 |
| | | | | 264/153 |
| 7,202,788 | B2 * | 4/2007 | Shieh | G06K 19/07798 |
| | | | | 340/572.1 |
| 8,593,258 | B2 * | 11/2013 | Cheng | G06K 19/0739 |
| | | | | 340/572.1 |
| 8,636,934 | B2 * | 1/2014 | Watson | B29C 45/14836 |
| | | | | 264/328.18 |
| 9,005,505 | B2 * | 4/2015 | van Wijk | A01K 11/004 |
| | | | | 264/272.17 |
| 9,340,339 | B2 * | 5/2016 | Magno, Jr. | B65D 63/1063 |
| 9,809,362 | B2 * | 11/2017 | Verhoeven | H01Q 1/2225 |
| 2006/0109118 | A1 * | 5/2006 | Pelo | G06K 19/077 |
| | | | | 340/572.1 |
| 2006/0160628 | A1 | 7/2006 | Abe | |
| 2007/0278314 | A1 | 12/2007 | Chapet | |
| 2012/0192471 | A1 * | 8/2012 | Watson | B29C 45/2708 |
| | | | | 40/665 |
| 2012/0248199 | A1 | 10/2012 | Schimmel | |
| 2012/0279023 | A1 * | 11/2012 | Burout | B29C 48/05 |
| | | | | 264/37.1 |
| 2013/0048651 | A1 | 2/2013 | Eggmann et al. | |
| 2013/0081232 | A1 * | 4/2013 | Magno, Jr. | B29C 45/16 |
| | | | | 24/16 PB |
| 2019/0176653 | A1 | 6/2019 | Fuehrer et al. | |

FOREIGN PATENT DOCUMENTS

| | | |
|---|---|---|
| DE | 69613341 | 11/2001 |
| DE | 102005024681 | 12/2006 |
| DE | 102006047714 | 10/2007 |
| DE | 60036294 | 12/2007 |
| DE | 102012224173 | 3/2013 |
| EP | 0257681 | 3/1988 |
| EP | 0692770 | 1/1996 |
| EP | 2165293 | 11/2012 |
| FR | 2760998 | 9/1998 |
| FR | 2882680 | 5/2009 |
| GB | 2421877 | 7/2006 |
| JP | S61268416 | 11/1986 |
| JP | 2014112132 | 6/2014 |
| KR | 20040083305 | 10/2004 |
| PT | 1902409 | 11/2011 |
| WO | 9852735 | 11/1998 |
| WO | 2014042540 | 3/2014 |

OTHER PUBLICATIONS

"Extended European Search Report", EP Application No. 20203382.5, dated Apr. 8, 2021, 8 pages.

"Foreign Office Action", CN Application No. 20201123005.5, dated Mar. 24, 2022, 22 pages.

* cited by examiner

INJECTION MOLDING A DEVICE SUCH AS A CABLE HOLDER WITH AN INTEGRATED WIRELESS TAGGING FOIL

CROSS-REFERENCE TO RELATED APPLICATION

This application claims priority to German Patent Application Number 102019130175.0, filed on Nov. 8, 2019, the disclosure of which is hereby incorporated by reference in its entirety herein.

FIELD OF THE INVENTION

The invention relates to a foil over-molding process, in particular an RFID or optical foil over-molding process, for devices such as a cable holder with an integrated wireless tag.

BACKGROUND

For products and processes of increasing size and complexity, labelling or tagging parts involved in the process and/or product becomes more and more essential. As a consequence, an increasing number of components in the respective product and/or process, in particular very small parts, need to be labelled or tagged. This can be done by radio-frequency-identification (RFID) tags, for instance RFID chips integrated into the respective label. An alternative may be an optical tag, for instance a bar code or a company logo integrated in the respective label. Such a label should be small, in particular flat, robust and easy to manufacture. One possibility to address this issue is to mold an RFID glass transponder into the label, which may have the form of a cable tie.

However, molding a glass transponder into a flat device such as a cable tie is a relatively complex, time-consuming process comprising a large number of process steps. Also, molding processes from other devices such as chip cards, compare FR2882680 B1 or gain tokens, see DE 69613341 T1, are produced used relatively time-consuming processes.

Consequently, the objective technical problem to be solved by the invention is to simplify and speed up the manufacturing process of a device with an integrated wireless tag or label.

SUMMARY

This problem is solved by the subject matter of the independent claims. Advantageous embodiments are apparent from the dependent claims, the description and the figures.

One aspect relates to a method for injection molding a device with an integrated wireless tag. In particular, the device with an integrated wireless tag may be a cable tie with an integrated wireless tag. The wireless tag may be an electrical tag such as an RFID tag for wireless radiofrequency tagging or an optical tag such as a barcode or alike for optical tagging. The method comprises a number of method steps.

A first method step is putting, as wireless tag, a tagging foil with two (parallel) main surfaces which are separated by an outer edge, into a mold cavity of an open mold where the tagging foil is held in place by a supporting device. The supporting device may, at least in part, be part of the mold. The foil may have a thickness of less than 1 mm, preferably less than 0.4 mm, preferably less than 0.2 or less than 0.15 mm. In particular, the foil may have a sandwich structure with one tagging-relevant layer, for instance a chip-and-antenna layer, in between two outer layers. Typically, in order to protect the tagging-relevant layer, the outer layers are larger and may also be thicker than the tagging-relevant layer, and form a protective border region or frame around the tagging-relevant layer, i.e. the tagging-relevant area. In said border region, the two outer layers are attached to each other directly, whereas in the region protected by the border region, the tagging-relevant and hence sensible layer separates the two outer layers.

A next step is closing the mold or injection mold. This is followed by injecting an injection material, preferably a thermoplast, into the mold cavity parts adjoining the two main surfaces of the tagging foil simultaneously and symmetrically with respect to a main extension plane of the tagging foil. The main extension plane of the tagging foil is parallel to the two main surfaces of the tagging foil. The mold cavity parts are parts or sections of the mold cavity, i.e. the mold is a mold, in particular an integral mold, containing different sections. Some of these sections form said cavity parts. Subsequently, the device with the integrated wireless tag may be ejected from the mold. Preferably, the described method steps are executed in the described sequence. In particular, no additional injecting steps, that is, no additional steps including injection of material into a mold are performed as described in more detail below.

The simultaneous and, with respect to the main extension plane of the tagging foil, symmetric injection of the injection material into the mold cavity parts that adjoin the two surfaces of the tagging foil, has the effect that the forces on the tagging foil on the opposite surface sides, that is, for instance, upper and lower side of the foil, are balanced. Therefore, the foil is not deformed significantly in a direction perpendicular to its main extension plane and thus not damaged in the molding process. Also, the device with the integrated wireless tag, i.e. the device bearing the tagging foil may be very thin as the risk of the foil, in particular the tagging-relevant area of the foil being exposed to the environment is reduced significantly. Consequently, the tagging foil may be overmould without prior steps of stabilizing the foil with the layer-by-layer molding known from the state of the art. So, the described method saves time and resources.

In an advantageous embodiment, the injecting of the above described injecting step is done using an entrance for the injection material to said cavity parts adjoining the two main surfaces of the tagging foil which is located such that the injection material that is forced through said entrance contacts the edge of the tagging foil as first part of the tagging foil and subsequently flows alongside the two main surfaces of the tagging simultaneously and symmetrically with respect to the main extension plane of the tagging foil. This can be achieved, for instance, with an entrance which is formed as a slit that runs parallel to the edge. In other words, the material is injected into the mold cavity parts adjoining the two main surfaces of the tagging foil from a lateral side of the tagging foil. Here, the lateral side is the side different from the upper and lower side of the foil, which correspond to the two main surfaces of the tagging foil. Here, the terms "upper" and "lower" are chosen arbitrarily to differentiate the two different sides in an intuitive way, i.e. independent of a spatial orientation of the tagging foil. Consequently, the entrance to said cavity parts is orientated perpendicular to the main plane of the tagging foil. Here, the orientation of the entrance is defined by the direction of the flow of the material through the entrance when injecting the material and/or a normal vector of a cross-section of the entrance.

This gives the advantage that the simultaneous and symmetrical injection of the injection material in the mold cavity parts adjoining the two main surfaces, and thus the balance of forces on upper and lower side of the foil can be achieved very reliable—in particular more reliable than, for instance, using two separate entrances at opposing sides, for instance upper and lower side, of the tagging foil. Therefore, the process can be sped up.

Consequently, it is particularly advantageous if the injection material is injected into said cavity parts, or even the entire mold cavity, only via said single entrance. So, it is particularly advantageous if the entrance is a single entrance, that is, the only entrance for the injection material to said cavity parts adjoining the two main surfaces of the tagging foil or even the entire mold cavity. This results in the advantage that the process is easier to control and may thus be executed with increased speed.

In another advantageous embodiment, the above-described injecting step includes forcing a stream of injection material through the entrance into said cavity parts where the stream is divided, by the edge of the tagging foil, into two equal-sized sub-streams flowing alongside the two main surfaces of the tagging foil. So, considering a cross-section of the entrance being perpendicular to the orientation of the entrance, an orthogonal projection of the edge of the tagging foil on the area of the entrance divides the cross-section of the entrance into two areas of equal size. Here, parts of the stream that flow alongside the edge of the tagging foil and do not flow "above and below" the foil, i.e. parts that cannot be projected on the foil by an orthogonal projection, and hence do not exert any force in a direction perpendicular to the main plane of the foil, may be neglected. Preferably, the orientation of the entrance is perpendicular to the orientation of the main plane of the tagging foil, that is, the orientation of the entrance (which may be the orientation of its cross-section and/or the averaged direction of the stream of injection material through the entrance during the injecting) may be parallel to the main plane of the tagging foil, as, in the context of this disclosure, the orientation of a plane is defined by its normal vector.

This gives the advantage that the balance of forces on the two opposite sides, that is, upper and lower side corresponding to the two main surfaces of the tagging foil may be realized with enhanced reliability and, in particular, a flutter of the foil may be avoided. Consequently, the process may be sped up further.

In another, particularly advantageous embodiment, the device with the integrated wireless tag is formed with one single injection step, that is, formed by a so-called "single shot" where injecting an injecting material into a mold is only performed once in the production process of the device.

This gives the advantage that the production process of the device is easier to control and requires less time.

In another advantageous embodiment, when held in place by the support device, the support device is in mechanical contact with the tagging foil only in one or more areas of the tagging foil that have a minimal distance >0 mm, in particular >0.3 mm, preferably >0.6 mm, from a tagging-relevant area of the tagging foil. The distance is measured in the main plane of the tagging foil. The tagging-relevant area of the tagging foil may be an area of an RFID foil, for instance an area where chip and antenna are located. Consequently, the tagging-relevant area may be a chip-antenna area of the tagging foil, provided the tagging foil comprises or is a chip-antenna foil for wireless radio frequency tagging such as RFID tagging. Consequently, the tagging-relevant area is not in mechanical contact with the support device and/or the mold. In other words, the tagging-relevant area is floating freely in the cavity, only held in place by the frame of the foil. Alternatively or in addition to the tagging-relevant area being, for instance, a chip-antenna area of a chip-antenna foil, in particular an RFID tagging foil, the tagging-relevant area may by an optical-code area such as an area where a barcode, a matrix code or the like of an optical tagging foil is arranged.

This gives the advantage that the tagging-relevant area of the tagging foil is protected by the injection material from influence from the environment, enhancing reliable functioning of the wireless tag. Furthermore, in the production process, the support device is less likely to damage the tagging-relevant area of the tagging foil. Also, a force exert on the foil may be increased, leading to stable and precise fixation of the foil during the injecting of the injection material, again enabling increased process speed.

In another advantageous embodiment, the above-described putting step includes holding the tagging foil in place by a vacuum and/or by a positioning pin. Correspondingly, the supporting device comprises a vacuum and/or pinning device for holding the tagging foil in a defined position.

This gives the advantage that a particularly precise positioning of the tagging foil is enabled which further increases the accuracy of the balance of forces on the different sides of the tagging foil, adding to the above-mentioned advantages.

In a further advantageous embodiment, the above-described closing step includes pinching or catching the tagging foil in between a set of at least one pair of opposing surfaces of the support device, preferably an even number such as at least six, at least eight, at least ten or at least twelve pairs of matching surfaces. The respective opposing surfaces may be formed by independently movable parts of the mold, e.g. one surface of a respective pair of opposing surfaces in the injection mold, i.e. in the A plate, and the other surface of the respective pair of opposing surfaces in the ejector mold, i.e. in the B plate. These opposing surfaces are then pressed towards each other while closing the mold and hence fix the tagging foil in the given position, that is, in its initial place. Alternatively or in addition, the support device may include additional elements such as a spring element and/or a hydraulic element where at least one surface of each pair of surfaces is pressed towards the other surface by said spring element and/or hydraulic element. So, the supporting device may (also) serve as a pinching or clamping device. Preferably, the tagging foil is pinched at its edge, means that the opposing surfaces of one respective pair of opposing surfaces partly contact each other when the mold is closed. The opposing surfaces preferably contact the tagging only outside the above-mentioned tagging-relevant area, i.e. only at the frame.

This gives the advantage that the tagging foil is held in its place particularly reliable. This ensures a particular good balance of forces on the opposing sides of the foil and allows injection molding with increased speed, while maintaining the reliable functioning of the tagging foil and thus, the wireless tagging.

In a further advantageous embodiment, the tagging foil is or comprises a chip-antenna foil for wireless radio-frequency tagging, in particular radio-frequency-identification (RFID) foil for radio-frequency identification, preferably for passive-tag-radio-frequency identification. In addition or alternatively, the tagging foil is or comprises an optical foil for optical tagging, in particular an optical-barcode foil for optical barcode identification and/or an optical-matrix foil for optical matrix-code identification and/or an optical-logo or optical-picture foil for optical logo or picture identification. In the case of wireless radio-frequency tagging, the injection material preferably is transparent for signals of the radio-frequency used during the identification of the tag or label. This is usually the case for thermoplastics. In the case of wireless optical tagging, the injection material preferably is transparent for optical signals, i.e. for light of the visible spectrum or for a given subspectrum of the visible spectrum.

The proposed method is particularly advantageous for chip-antenna foils, in particular RFID foils as these foils are very sensitive and thus conventionally are processed in injection molding using several injection steps. Consequently, with the proposed method, devices with integrated wireless radio-frequency tags, in particular RFID tags, can be produced reliably and fast. As for the optical tagging or labelling, deforming of the foil during the molding process is avoided with the proposed method, resulting in improved legibility and, in particular in case of a company logo or a picture, a clear and unambiguous presentation of the logo or the picture.

In yet another advantageous embodiment, the device with the integrated wireless tag may be a cable holder or a token, in particular a gaming coin or a smart/chip card or an intermediate product for another device. In particular, the device with integrated wireless tag may be a flat device, that is, a device with a main extension in a main extension direction being much larger than its extension in the minimal extension direction. For instance, the length may be at least four times, preferably at least ten times or even at least 15 times bigger than its thickness.

This gives the advantage that a foil is particularly suited to be included into the device and, as said devices are usually produced in high quantities, the effect of the sped-up production process is particularly high.

Another aspect relates to a molding device for injection molding a device, in particular a cable tie, with an integrated wireless tag according to the method described above.

An additional aspect relates to a device with an integrated wireless tag, in particular a cable tie, formed by injection molding according to any of the described methods.

Advantages and advantageous embodiments of the molding device and the device with the integrated wireless tag correspond to advantages and advantageous embodiments of the described method.

The features and combination of features described above as well as the features and combinations of features disclosed in the figure description or the figures alone may not only be used alone or in the described combination but also in combination with other features or without some of the disclosed features without leaving the scope of the invention. Consequently, embodiments that are not explicitly shown and described by the figures but that can be generated by separately combining the individual features disclosed in the figures are also part of the invention. Therefore, embodiments and combinations of features that do not comprise all features of an originally formulated independent claim are to be regarded as disclosed. Furthermore, embodiments and combinations of features that differ from or extend beyond the combination of features described by the dependencies of the claims are to be regarded as disclosed.

BRIEF DESCRIPTION OF THE DRAWINGS

Exemplary embodiments are further described by the following means of schematic drawings. Therein.

In the figures, identical or functionally identical elements have the same reference signs.

DETAILED DESCRIPTION

Figure 1:
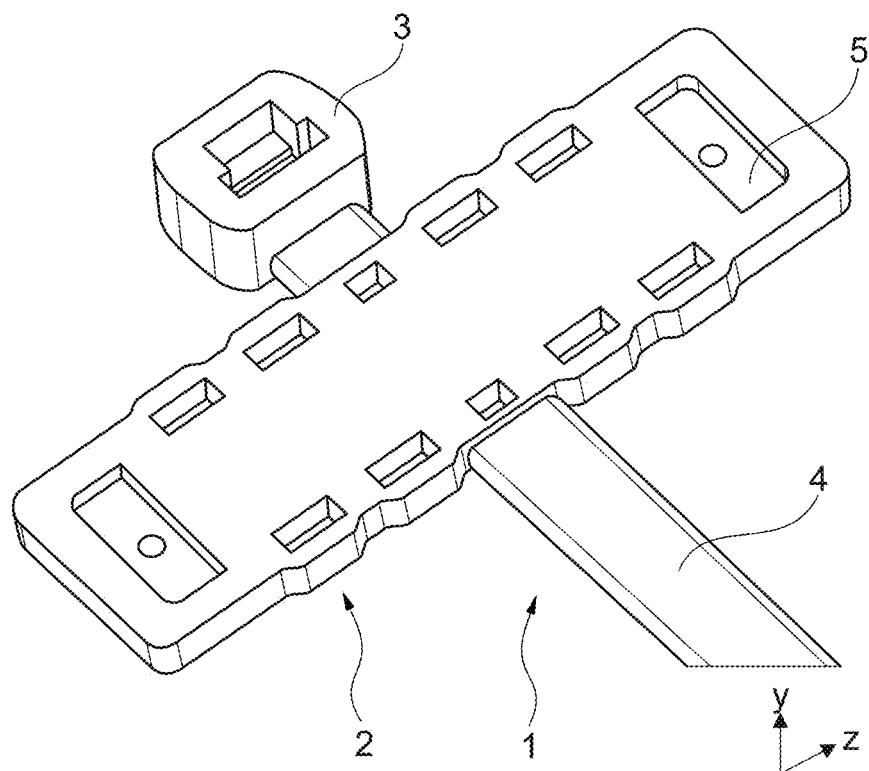
FIG. 1 shows a perspective view of an exemplary embodiment of a device with an integrated wireless tag, here a cable tie.

FIG. 1 shows a perspective view of an exemplary embodiment of a device 1 with an integrated wireless tag 2. In the present example, the device 1 is a cable tie where the wireless tag 2 is arranged between the head 3 and the tail 4 of the cable tie 1. The wireless tag 2 is or comprises a tagging foil 5 which is, in the present example, a chip-antenna foil for RFID, in a short a RFID foil.

Figure 2:
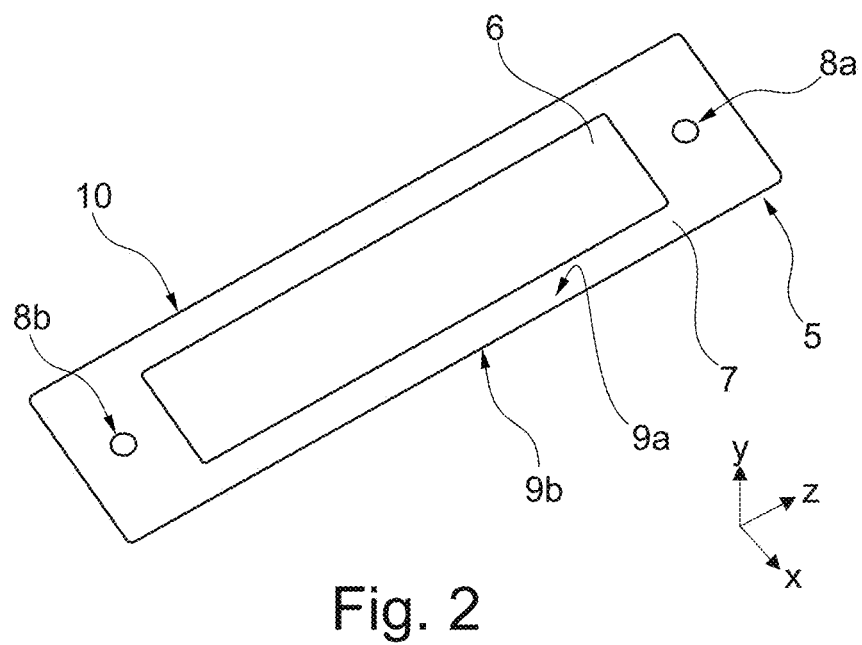
FIG. 2 shows a perspective view of an exemplary embodiment of a tagging foil.

The tagging foil 5 is shown in more detail in FIG. 2. Tagging foil 5 has a tagging-relevant area 6 in the center of the tagging foil 5 which is surrounded by a protective margin or frame 7 here. In the present example, the tagging foil 5 also has two holes 8a, 8b at opposite ends in the z-direction for precisely adjusting the tagging foil 5 in its place. In the present example of the tagging foil as RFID foil, the tagging-relevant area is an antenna-chip-area where the antenna and chip required for the RFID function of the tagging foil 5 is located. The tagging-relevant area 6 is thus more susceptible to damage than the frame 7.

In FIG. 2, the view of one of two main surfaces 9a, 9b of the tagging foil 5 is provided. Here, for illustrative purposes, the shown main surface may be referred to upper main surface 9a without delimiting character, as its orientation in space is arbitrary. Upper main surface 9a and lower main surface 9b (now invisible) are separated from each other by an outer edge 10.

Figure 3:
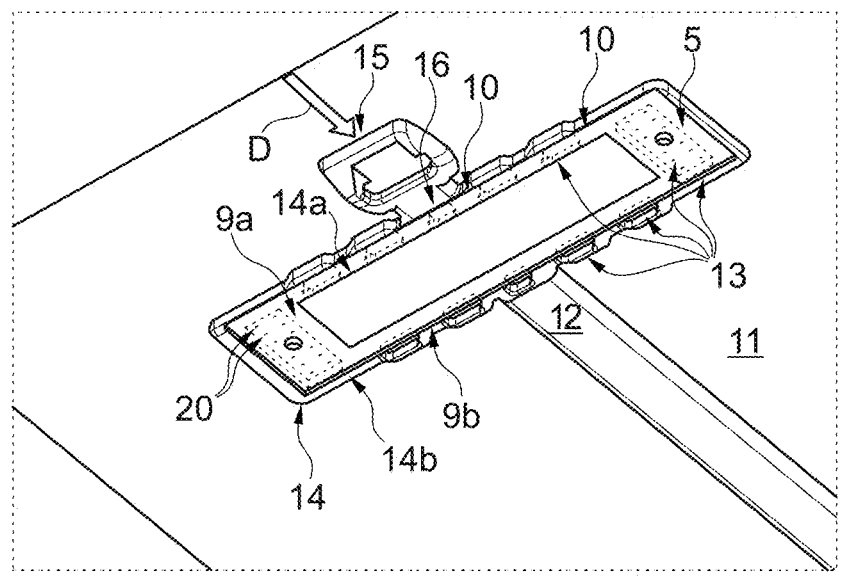
FIG. 3 shows a perspective view of an exemplary embodiment of an open mold with the tagging foil of FIG. 2.

FIG. 3 shows a perspective view of an exemplary embodiment of a mold 11 for injection-molding a device 1, in the present example a cable tie, with an integrated wireless tag 2. Here, for exemplary illustration purposes, the tagging foil 5 of FIG. 2 is put into a mold cavity where it is held in place by a supporting device 13 described in more detail later referring to FIG. 4.

The tagging foil 5 is held in place by the supporting device 13 such that a mold cavity part 14 comprising the tagging foil 5 is separated into two mold cavity parts 14a, 14b adjoining the two main surfaces 9a, 9b. Advantageously, two mold cavity parts 14a, 14b are of equal volumes. Note that for illustrative purposes, only one half of the mold 11, which may be referred to as the lower half of the mold 11, is shown.

Figure 4:
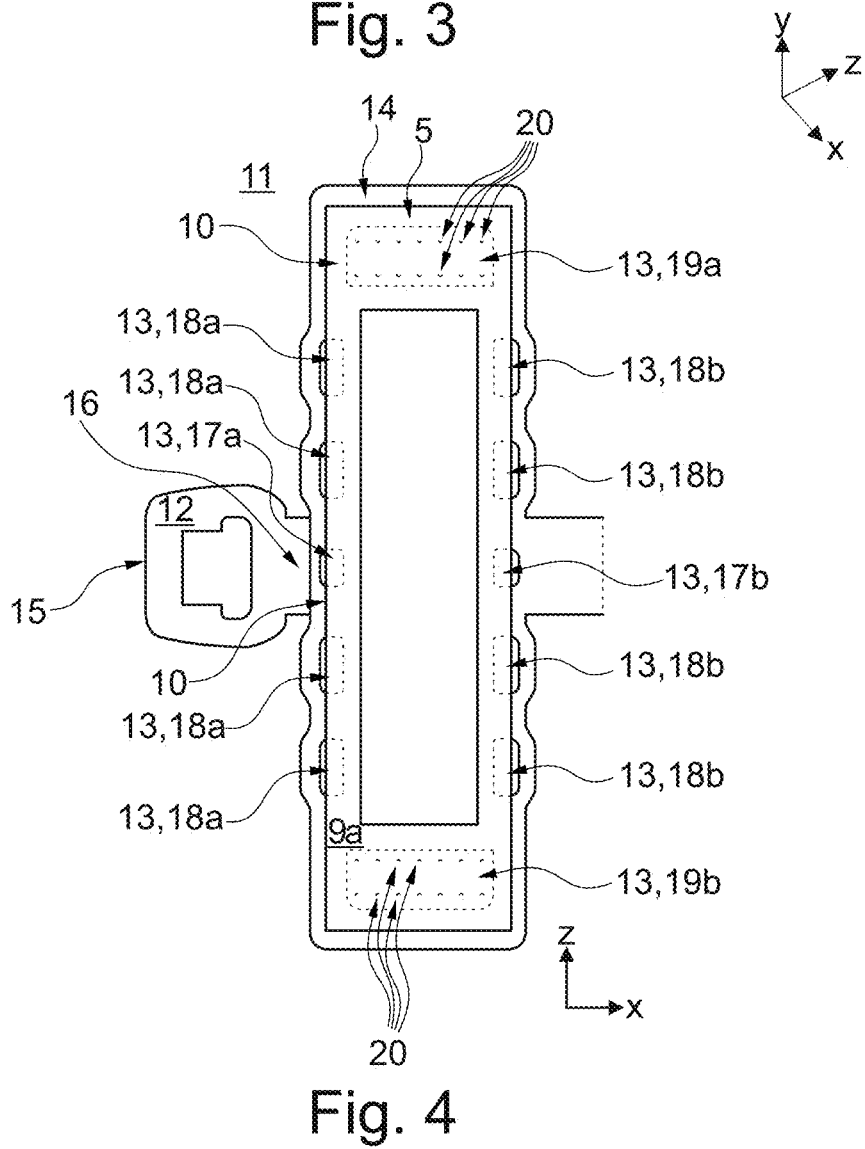
FIG. 4 shows a top view of the open mold of FIG. 3.
Figure 5:
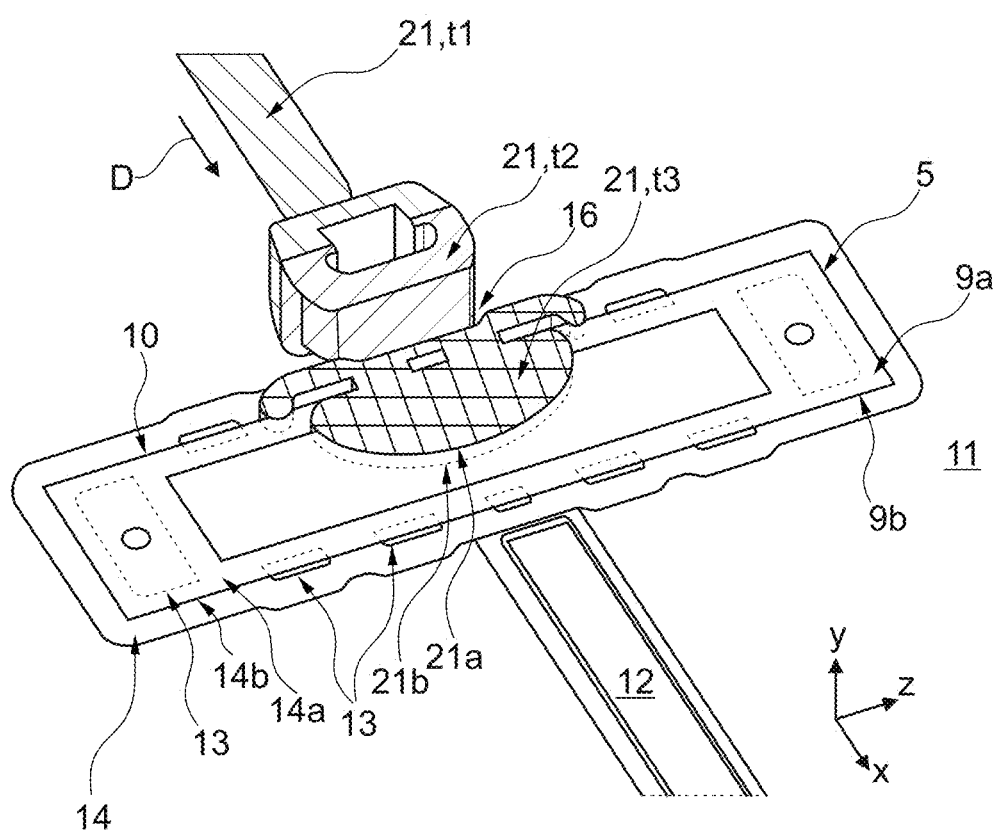
FIG. 5 shows a perspective view of a 3D-illustration of an exemplary injection of material into an exemplary embodiment of a closed mold.

Consequently, the edge 10 of the tagging foil 5 is fixed in a position such that a stream of injection material injected into the mold cavity 12 at an upper left of the figure, that is, flowing from the injection site 15 (here, corresponding to the head 3 of the cable tie) through mold cavity 12 in x-direction into the mold cavity part 14 via an entrance 16 is divided by the edge 10 into two sub-streams flowing alongside the two main surfaces 9a, 9b of the tagging foil 5 have equal size (see FIG. 5). Consequently, in the present example, the entrance 16 is located such that the injection material contacts the edge 10 of the tagging foil 5 before subsequently flowing alongside the two main surfaces 9a, 9b of the tagging foil 5 when the injection material is injected into the closed mold 11 (see FIG. 5). The edge 10 may be regarded as being located in a vertical centre of the entrance 16 leading to a horizontal division of the stream of injection material 21 (FIG. 5), as, corresponding to the two equal-sized sub-streams, the orthogonal projection onto the diameter area of the entrance 16 divides the diameter area into two areas of equal size. Here, as also apparent from FIG. 4, the orientation of the entrance 16 and, consequently, the direction of a flow of injection material into the injection step is running parallel to the main surfaces 9a, 9b, that is, parallel to the main extension plane of the tagging foil 5, the x-z-plane.

FIG. 4 shows a top view of the mold 11 of FIG. 3. The support device 13 comprises a number of pairs of opposing surfaces 17a, 17b, 18a, 18b, 19a, 19b, where only one of the opposing surfaces of the respective pairs is shown as the second half of mold 11 comprising the (preferably symmetric) second half of mold cavity part 14, mold cavity part 14a (FIG. 3), is not depicted here.

When the tagging foil 5 is put into the mold 11, it is laid onto said surfaces 17a-19b with the frame 7 in order to avoid mechanical interference of the support device 13 with the tagging-relevant area 6, in particular the chip-and-antenna of the RFID foil. Consequently, the tagging-relevant area of the tagging foil 5 is floating freely in the mold cavity 12. As shown in FIG. 4, the surfaces 17a, 17b, 18a, 18b, 19a, 19b preferably contact the tagging foil 5 at its edge 10, such that, when the mold 11 is closed, the tagging foil 5 is pinched between some opposing surfaces 17a, 17b, 18a, 18b, preferably but not necessarily all of the opposing surfaces 17a-19b. If pinched at the edge, this results in a stiffening of the edge 10 that fosters the simultaneous and symmetric flow of the injection material 21 (FIG. 5) into the mold cavity parts 14a, 14b adjoining the two main surfaces 9a, 9b of the tagging foil 5 and the balancing of the forces on the tagging foil 5 on its upper and lower side.

In the present example, the pairs of opposing surfaces 17a-19b are arranged symmetrical to the main extension of the tagging foil 5 both in respect to the main flow direction, here x-direction, of the injection material 21 as well as in a line perpendicular to the flow direction (i.e. a line in the z-direction). Namely, in the example at hand, for each pair of opposing surfaces 17a, 18a located upstream in the flow direction (left side of the figure), there is a corresponding symmetric counterpart 17b, 18b located downstream the flow direction (right side of the figure). In the present example, two central pairs of opposing surfaces 17a, 17b closest to the entrance 16 have a smaller area than the outer pairs of opposing surfaces 18a, 18b, 19a, 19b further away from the entrance 16. This combines enhanced reliability in the holding of the tagging foil 5 with minimal obtrusion of the flow of injection material through the mold cavity 12 by the supporting device 13. In the present example, the upstream central pair of opposing surfaces 17a vertically divides the stream of injection material flowing through the entrance 16 into two sub-streams of equal size. This corresponds to the horizontal division by edge 10 explained above.

In the present example, the outermost pairs of opposing surfaces 19a, 19b that are located at the opposing ends of the tagging foil 5 with a maximal distance feature a vacuum device. So, in the present example, at least one of the respective surfaces has holes 20 which allow, when connected to a vacuum, to hold the tagging foil 5 in place by the vacuum. Correspondingly, said outermost opposing surfaces 19a, 19b are not in contact with the edge 10 here. Said outermost pairs of opposing surfaces 19a, 19b also have the largest area in the present example as they are furthest away from each other and thus the emerging tension between the pairs of opposing surfaces 19a, 19b are larger than thus the emerging tension between the pairs of opposing surfaces closer to each other, e.g. the pairs of opposing surfaces 17a, 17b.

FIG. 5 illustrates the flow of an injection material 21 at different times t1, t2, t3 for an exemplary mold 11 as shown in FIGS. 3 and 4. Following the injection direction D, which runs parallel to the x-direction here, the injection material 21 enters, at time t1, the mold cavity 12 at injection site 15 (FIGS. 3, 4). As it fills up the mold cavity 12, at time t2, it starts entering the mold cavity area 14 with the tagging foil 5 through entrance 16. At a third, subsequent time t3, it has, as apparent by the edges 21a and 21b of the injection material 21, moved into the mold cavity parts 14a, 14b adjoining the two main surfaces 9a, 9b of the tagging foil 5 simultaneously and symmetrically with respect to the main extension plane of the tagging foil 5. So, the lateral injection of the injection material 21 advantageously leads to balanced vertical forces on the tagging foil 5 (vertical relates to the y-direction in FIG. 5).

This has the effect that the tagging foil 5 remains intact and well protected by the injection material 21, allowing the production of an injection-moulded device with integrated wireless tag with a single injecting step.

What is claimed is:

1. A method for injection-molding a device with an integrated wireless tag, the method comprising:
 a) putting a tagging foil with two main surfaces that are separated by an edge into a mold cavity of an open mold that includes mold cavity parts that adjoin the two main surfaces of the tagging foil, wherein the tagging foil is held in place by a supporting device;
 b) closing the mold; and
 c) injecting, in a single injection step, an injection material into the mold cavity parts simultaneously and symmetrically with respect to a main extension plane of the tagging foil parallel to the two main surfaces of the tagging foil to form the device with the integrated wireless tag.

2. The method according to claim 1,
 wherein the injecting step c) includes using an entrance to said mold cavity parts that is located such that the injection material that is injected through said entrance contacts the edge of the tagging foil and subsequently flows alongside the two main surfaces of the tagging foil.

3. The method according to claim 2, wherein the injecting step c) includes dividing, by the edge of the tagging foil, the injection material into two sub-streams flowing alongside the two main surfaces of the tagging foil.

4. The method according to claim 1,
 wherein the tagging foil is held in place by the supporting device by contacting the supporting device only in one or more areas of the tagging foil that have a minimal distance from a tagging-relevant area of the tagging foil, wherein the distance is measured in the main extension plane of the tagging foil.

5. The method according to claim 4, wherein the minimal distance is greater than zero and less than about 6 mm.

6. The method according to claim 1,
 wherein the putting step a) includes at least one of:
 holding the tagging foil in place by a vacuum; or
 holding the tagging foil in place by a positioning pin.

7. The method according to claim 1, wherein the closing step b) includes pinching the tagging foil in between a set of at least one pair of opposing surfaces of the supporting device.

8. The method according to claim 7, wherein the at least one pair of opposing surfaces comprise an even number of pairs.

9. The method according to claim 8, wherein the even number of pairs comprises at least 6, at least 8, at least 10, or at least 12 pairs of matching surfaces.

10. The method according to claim 7, wherein the pairs of opposing surfaces are arranged symmetrical in respect to at least one of a main flow direction of the injection material or a line perpendicular to the main flow direction.

11. The method according to claim 1, wherein the tagging foil comprises a chip-antenna-foil for wireless radio-frequency tagging.

12. The method according to claim 11, wherein the chip-antenna-foil for wireless radio-frequency tagging comprises a radio-frequency-identification (RFID) foil for passive-tag-radio-frequency identification.

13. The method according to claim 1, wherein the tagging foil comprises an optical foil for optical tagging.

14. The method according to claim 13, wherein the optical foil comprises at least one of an optical-barcode foil, an optical-matrix foil, an optical-logo, or an optical-picture foil.

15. The method according to claim 1, wherein the device with the integrated wireless tag further comprises at least one of a cable tie, a cable holder, or a token.

16. The method according to claim 1, wherein the device with the integrated wireless tag further comprises at least one of a gaming coin, a card, or an intermediate component for another device.

* * * * *